April 16, 1968          E. SCHREMPP          3,377,882
MECHANICAL ENERGY STORAGE SYSTEM
Filed Aug. 26, 1965          2 Sheets-Sheet 1
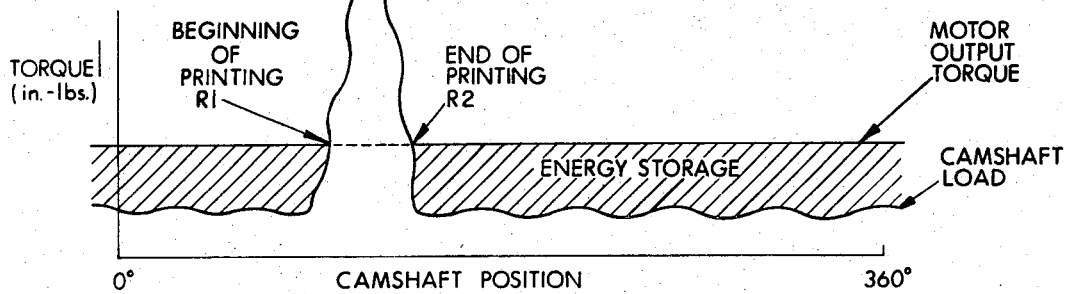
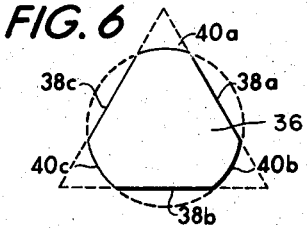
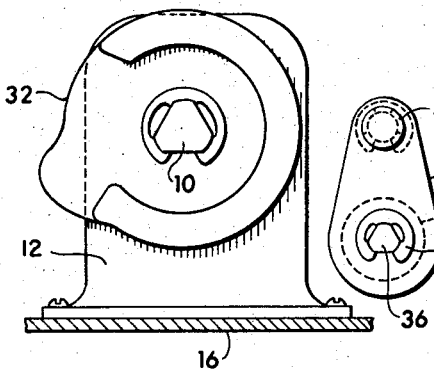
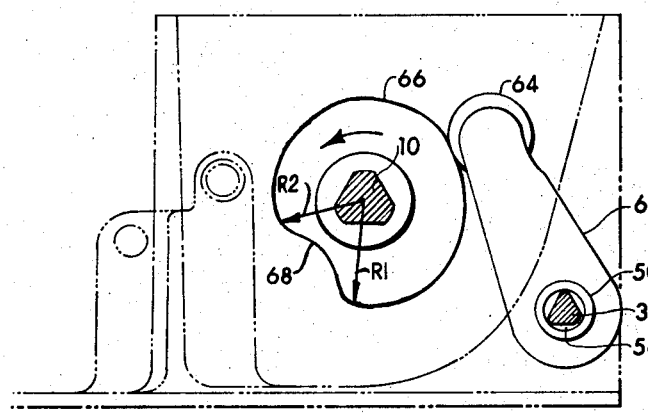
INVENTOR
ERNST SCHREMPP
BY
ATTORNEY

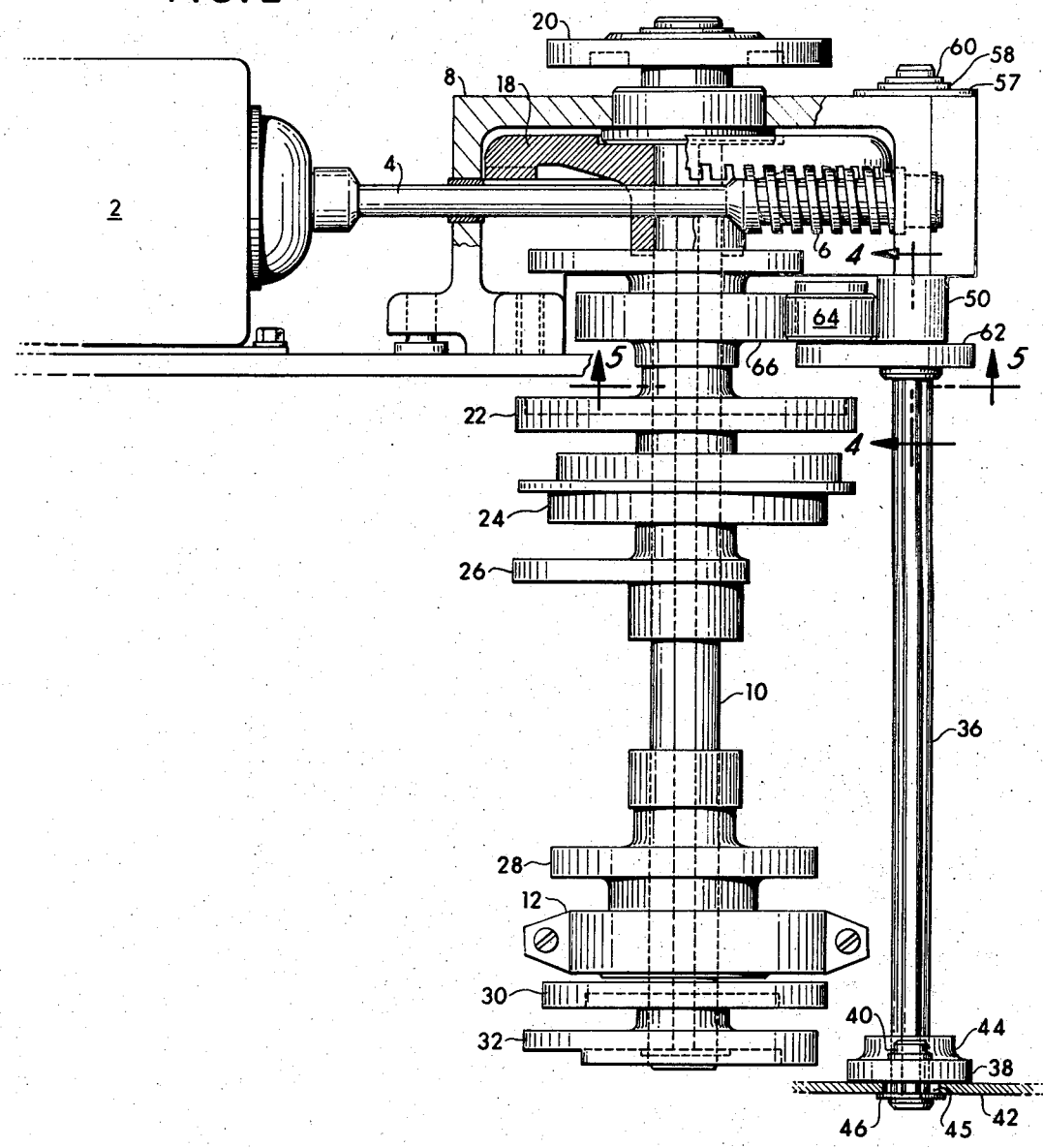

United States Patent Office 3,377,882
Patented Apr. 16, 1968

3,377,882
MECHANICAL ENERGY STORAGE SYSTEM
Ernst Schrempp, Norwalk, Conn., assignor to
Pitney-Bowes, Inc., Stamford, Conn., a corporation of Delaware
Filed Aug. 26, 1965, Ser. No. 482,697
11 Claims. (Cl. 74—567)

ABSTRACT OF THE DISCLOSURE

An energy storage mechanism for a drive system comprising an improved torsion bar characterized by a generally triangular cross-section, and means for imparting a torsional energy-storing movement to the torsion bar during a predetermined portion of the operating cycle of the drive mechanism and for returning the stored energy to the drive mechanism during another portion of the same cycle. The torsion bar is self-centering and one end thereof is supported by means that effectively act as an extension thereof.

---

The present invention relates to improvements in energy storage mechanisms and more particularly to a novel torsion bar and use thereof in a new energy storage mechanism for a rotary drive system.

Many different machines involve electrically powered drive mechanisms that are required to repetitively operate a cam shaft through a predetermined cycle of operation wherein a number of functions are performed by one or more mechanisms operating off of the cam shaft. The load on such a drive mechanism will vary substantially during a given machine cycle according to which and how many mechanisms are being operated by the common cam shaft at a given time. A problem arises where the torque load on the cam shaft is relatively small throughout most of the machine cycle but reaches a peak during a relatively short interval. It is essential that the electric motor of the drive system be capable of handling the torque load throughout the full machine cycle; otherwise the machine might stall or overloading of the motor might cause excessive heating and result in motor failure. On the other hand, considerations such as weight, space, or cost often require that the motor size be kept as small as possible. The usual solution to the problem is to use an electric motor whose maximum torque capability is somewhat less than the peak torque requirements of the cam shaft, and to utilize some auxiliary element or mechanism for assisting the motor to handle the peak torque requirement of the cam shaft. One common approach is to use the inertia force of a fly wheel to assist the electric motor in driving the cam shaft. However, a fly wheel is not always satisfactory, particularly where the drive mechanism operates intermittently and is designed to limit rotation of the cam shaft to a single revolution each time for each machine cycle.

Accordingly, a primary object of the present invention is to provide a novel rotary drive system which includes an energy storage mechanism that accumulates a substantial portion of the energy input to the drive system during a predetermined portion of its operating cycle and releases that energy back to the drive system at a selected time in the operating cycle, whereby the torque requirement of the prime mover for the drive system is substantially reduced.

Another object of the invention is to provide a novel drive system for a cam shaft whose torque load varies during the operating cycle of the machine of which the cam shaft forms a part, the drive system utilizing an energy storage mechanism which makes it feasible for the drive system to use a prime mover whose torque capability is substantially less than the peak torque requirement of the cam shaft.

Still another object of the invention is to provide a new and improved energy storage mechanism which is reliable, efficient, relatively easy to manufacture and assemble, and adapted to withstand extensive use over a long lifetime.

The foregoing objects are attained by providing a novel energy storage mechanism comprising a torsion bar, means for imparting energy to the torsion bar from the drive system's prime mover during the low torque demand period of the operating cycle of the cam shaft, and means for transmitting the energy stored in the torsion bar to the cam shaft during its peak torque demand period. Although various forms of torsion bars are well known to persons skilled in the art, they have one or more limitations which discourage their use as energy storage means in drive systems for compact business machines. For example, torsion bars of circular cross section present problems of anchoring and efficiency. Clamping the end of a circular torsion bar by a friction clamp, even if theoretically possible, introduces an opportunity for slippage and requires an anchoring element of substantial size. On the other hand, drilling holes in a circular torsion bar to facilitate anchoring will reduce its energy storage capacity, while splining it increases its cost and size. Other more sophisticated torsion bar designs have been conceived that exhibit greater energy storage than circular torsion bars when the detriments of anchoring are considered. However, these are quite expensive to machine and high cost discourages their use in competitively priced business machines.

Accordingly, a more specific object of the present invention is to provide a new and improved torsion bar which is efficient, easy to mount, and inexpensive to manufacture, yet exhibits substantially the same energy storage capacity as the most efficient torsion bars known to the prior art, again considering the detriments of anchoring. The torsion bars of the present invention are of generally triangular configuration, comprising flat sides meeting in rounded corners.

Other objects and many of the attendant advantages of the present invention will become more apparent as reference is had to the following detailed description of a preferred embodiment of the invention which is to be considered with the accompanying drawings wherein:

FIG. 1 schematically illustrates the problem of variable cam shaft loading to which the present invention is directed;

FIG. 2 is a plan view, partly in section, of a drive mechanism embodying the present invention;

FIG. 3 is a side view in elevation of a portion of the apparatus of FIG. 2;

FIG. 4 is a sectional view taken along line 4—4 of FIG. 2;

FIG. 5 is a sectional view in elevation taken along line 5—5 of FIG. 2; and

FIG. 6 is an enlarged cross-sectional view of a torsion bar embodying the invention.

The preferred embodiment of the invention illustrated in the drawings is designed for an electrically powered business machine wherein one or more mechanisms are operated off of a rotating cam shaft. More particularly, the illustrated embodiment is designed for an electrically powered postage meter embodying a printing head similar to the kind shown and described in my U.S. Patent No. 3,143,963, issued Aug. 11, 1964, for Inking Control Means for Printing Devices. In the machine for which the drive system is designed, the cam shaft makes one revolution each time the machine is operated. Throughout most of its cycle of operation, the cam shaft load is relatively even and is well below the maximum output torque capability of the electric motor which drives the system. However, at a particular interval during the operating cycle, the cam shaft is called upon to generate the force required to print. The resulting load on the cam shaft during this interval greatly exceeds the output torque of the motor. Nevertheless the energy storage system of the present invention allows the motor to drive the cam shaft during this interval without any hesitation or reduction in speed and without overloading the motor. This accomplishment is represented in FIG. 1 where the curve entitled "Camshaft Load" illustrates how the motor load exceeds the level of the maximum output torque of the motor during the interval that the printing mechanism is operating; and the hatched area indicates the available output energy of the motor which is accumulated by the energy storage mechanism during the low torque demand period and is given up to the cam shaft during its high torque demand period, i.e., when the printing operation is being performed.

Turning now to FIG. 2, the illustrated embodiment of the invention comprises a unidirectional electric motor 2 having an output shaft 4 that is provided with a worm 6. The shaft 4 is journaled in a suitable standard 8 which also serves as a bearing support for one end of a cam shaft 10. The opposite end of the cam shaft is rotatably supported in a standard 12 provided with suitable shaft bearings (not shown). It is to be noted that the standards 8 and 12 are attached to a suitable base plate 16 (see FIG. 3) which forms part of the chassis of the machine. Cam shaft 10 is driven by worm 6 through a suitable worm gear 18. The cam shaft is rotated counterclockwise (as viewed in FIG. 5) by worm 6. The cam shaft includes a plurality of cams and pulleys, some of which are identified at 20, 22, 24, 26, 28, 30 and 32, that are connected to and drive a number of mechanisms which contribute to the load on the cam shaft. In this connection, let it be assumed that the illustrated cam 32 drives a printing mechanism of the kind disclosed in said U.S. Patent No. 3,143,963 and that the operation of the printed mechanism results in a peak load on the cam shaft during a relatively small portion of each revolution thereof.

Disposed parallel to the cam shaft 10 is a torsion bar 36 of novel design. As seen best in FIG. 6, the torsion bar is of axially symmetrical cross-section, comprising three flat sides 38a, 38b and 38c which meet a concentrically rounded corners 40a, 40b and 40c. Preferably the bar is formed by drawing round bar stock to the cross-section shown in FIG. 6, in which the dimension from a flatted surface (38a, 38b, 38c) to the corresponding opposed rounded surface (40a, 40b, 40c) is approximately 9/10 of the diameter of a circumscribed circle, of which the rounded surfaces (40a, 40b, 40c) are segments. This particular configuration has several advantages in addition to ease of manufacture. The flat sides 38a, b and c enable it to be gripped without giving it a splined configuration or drilling it to receive an anchor pin. The grip afforded by its unique cross-sectional shape is sufficient to fully prevent any slippage between the torsion bar and the means to which it is connected. On the other hand, it has been determined from comparative tests that a torsion bar having the illustrated cross-sectional configuration is capable of storing the same energy as a circular bar of the same circumscribed diameter but at a lower stress level when the circular bar is gripped in a conventional manner, i.e., pinned.

In the illustrated embodiment, one end of the torsion bar 36 is anchored by means of a metal plate 38 which is attached by a rivet 40 to a sheet metal wall 42 that is formed integral with the base 16. The bottom portion of plate 38 is relatively thick as shown at 44. This relatively thick portion 44 is provided with a hole shaped to conform to the cross-sectional configuration of the torsion bar. The torsion bar extends through plate 38 and also bar 36 and sized so as to accurately fit with the torsion through the sheet metal wall 42, the latter being provided with a round hole 45 that is slightly larger than the largest cross-sectional dimension of the torsion bar. An E-ring 46 cooperates with wall 42 to prevent the torsion bar from being pulled out of metal plate 38.

The opposite end of the torsion bar is rotatably mounted in the standard 8 by means of a sleeve bearing 48 and a metal bushing identified generally at 50. The standard 8 is provided with a hole 52 to accommodate sleeve bearing 48; the latter is brazed to the standard. The bushing 50 makes a snug rotatable fit within sleeve bearing 48 and is provided with an axial bore that has two distinct portions. Referring to FIG. 4, the shorter right-hand portion 54 has a cross-section conforming to that of the torsion bar and is sized to snugly accommodate the torsion bar. The left-hand portion 56 of the axial bore is of circular cross-section and is sufficiently large to provide clearance between it and the torsion bar, so as to permit relative rotation. The right hand end of bushing 50 has a flange 57 that prevents bushing 50 from being pulled out of the standard 8 in the direction of the sheet metal wall 42. A washer 58 and an E-shaped retaining ring 60 prevent the torsion bar from being pulled out of the bushing toward wall 42. With the foregoing arrangement, the torsion bar 36 is incapable of moving axially. On the other hand, because of the relative rotation that is permitted between it and standard 8, the torsion bar is capable of being twisted with respect to its left-hand end which is anchored in plate 38 attached to the sheet metal wall 42.

Twisting of the torsion bar is accomplished by means of a lever arm 62 affixed to bushing 50. The free end of arm 62 is provided with a roller 64 which normally engages a cam 66 that is carried by cam shaft 10. The arm 62 and the roller 64 comprise a cam follower. Cam 66 which influences the cam follower is provided with a depression 68 in its peripheral surface. The radius of cam 66 is minimum at the depression 68, and beyond the limits of the depression the cam's surface ranges spirally from a maximum radius R1 to a minimum radius R2. Thus as cam 66 is rotated counterclockwise (FIG. 5) by the motor, its spiral surface acts on roller 64 to cause a twisting movement of the torsion bar in a clockwise direction. This twisting movement continues until that portion of the spiral surface characterized by the radius R1 has moved into engagement with roller 64. At this point the energy stored in the bar is at a maximum. Thereafter, as the cam depression 68 moves into line with roller 64, the bar begins to release its stored energy back to the cam 66. The geometrical configuration of depression 68 produces a smooth yet rapid release of energy from the torsion bar and facilitates application thereof to the cam in a direction to assist the motor in rotating the cam shaft. The resultant increase in the torque input to the cam shaft is sufficient to enable it to handle the peak load attendant to the printing operation. Of course the angular relationship between cam 32 and cam 66 is such that the transfer of energy from the torsion bar to the camshaft occurs during the interval that the printing mechanism is operated. The beginning and end of the printing operation and the relation thereto of the points on cam 66 characterized by the radii R1 and R2 are shown in FIG. 1. Starting at the normal at-rest position of the cam shaft (represented as 0°), the torque output of the motor exceeds the cam shaft torque load and this excees torque works to twist the torsion bar (already partly twisted from a previous cycle of operation) to the full energy storage limit which occurs at R1. The release of energy stored in the torsion bar and the printing operation occur between R1 and R2. Following R2 the motor output torque again exceeds the cam shaft torque requirement and this excess output works during the rest of the cam shaft's cycle of operation, i.e. until completion of 360° of revolution, to restore the torsion bar to its initial partly twisted condition.

In addition to maintaining the load seen by the motor within its output torque capability during each operating cycle of the machine, the energy storage mechanism just described has the advantage of ironing out ripples in the cam shaft torque requirement due to slight variations in mode of machine operation. A further advantage is derived from the method of rotatably anchoring the torsion bar 36 in the standard 8. By having the coaxial bore in bushing 50 large enough so as not to engage the torsion bar except at the extreme end of the torsion bar, the effective length of the torsion bar from an energy storage viewpoint is maximized. In this connection, it is to be observed that when the cam follower arm is urged in a direction to twist the torsion bar, it acts through substantially the full length of bushing 50. Thus, in effect, bushing 50 acts as an extension of the torsion bar to further improve the overall energy storage capacity of the mechanism. Other advantages of the mechanism stem from the unique cross-section of the torsion bar. For one thing, the generally triangular configuration makes it easier to grip than a bar of circular cross-section. For another thing, its cross-section enables the new torsion bar to store the same energy as a circular bar but at a lower stress level when the latter form of bar is gripped in a way involving alteration of its cross-section or moment of inertia, e.g. by splining its end or inserting a locking pin therein.

A further advantage is that the cross-sectional configuration shown in FIG. 6 is so easy to produce that it is feasible to use shafts of the same cross-section for uses other than as torsion bars. Thus, by way of example, the same generally triangular cross-section is embodied in cam shaft 10 where it offers the advantage of facilitating mounting of cams without the need for special keys or set screws to prevent rotation. Instead locking against rotation is achieved by forming the cams with central apertures conforming in shape to the cam shaft's cross-sectional configuration. The torsion bar also may be made from a variety of materials.

Although the embodiment illustrated in the drawings is intended for use in a compact postage meter machine, it is believed obvious to persons skilled in the art that the invention may be used in whole or in part in other machine applications. Thus the torsion bar per se is not restricted to use in a drive system in the manner illustrated in FIG. 2, but may serve other purposes such as a shock absorber in systems experiencing sudden or excess movement of dynamically loaded members.

It is to be understood that the invention is not limited in its application to the details of construction and arrangement of parts specifically described or illustrated, and that within the scope of the appended claims, it may be practiced otherwise than as specifically described or illustrated.

I claim:

1. An energy storage mechanism comprising a torsion bar of generally triangular cross-section throughout its length, said torsion bar comprising three flat sides of substantially equal size meeting in three rounded corners of substantially equal radii of curvature, first fixed means for anchoring one end of said torsion bar against rotation, said first means including a plate with a hole shaped to conform to the cross-sectional configuration of said torsion bar and sized to make a tight fit with said one end, second means rotatably supporting the opposite end of said torsion bar, said second means including a fixed member, a bearing supported by said fixed member, and a bushing rotatably mounted in said bearing, said bushing affixed to said opposite end, and means connected to said bushing adapted to twist said torsion bar to store energy therein and to transmit energy from said torsion bar to another element when said torsion bar is released.

2. An energy storage mechanism comprising a torsion bar of uniform cross section from one end to the other end thereof, means for anchoring one end of said bar against rotation, a bushing mounted on the opposite end of said bar, one portion of said bushing locked against rotation relative to said bar and the remainder of said bushing surrounding but spaced from said bar, stationary means rotatably supporting said bushing, and means connected to said remainder of said bushing for applying a torsional force to said bushing whereby to twist said bar relative to its said one end.

3. An energy storage mechanism comprising a torsion bar having a cross section that is uniform throughout its length and is characterized by a plurality of flat sides arranged in a symmetrical configuration, means for anchoring one end of said bar, a bushing mounted on the opposite end of said bar, said bushing having an axial bore in which said bar is disposed, in one portion of said bushing said axial bore having a cross-section that provides a locking connection with said bar and in the remaining portion of said bushing said axial bore having a cross section that is oversized with respect to said bar, whereby said remaining portion of said bushing is capable of torsional movement relative to said bar, and means connected to said remaining portion of said bushing for applying a rotational force to said opposite end of said bar by way of said bushing.

4. A elongate one-piece torsion bar having an axially symmetrical cross-section consisting of alternately ocurring flat and curved sides defined by the intersection of an equilateral triangle with a concentric circle, said flat sides being longer than said curved sides.

5. A torsion bar having an axially symmetrical cross-section consisting of three flat surfaces and three curved surfaces disposed in alternately occurring relation with said three flat surfaces, the dimension from a flat surface to a rounded surface that is opposite thereto being approximately 9/10 of the diameter of a circumscribed circle.

6. An energy storage mechanism as defined by claim 3 wherein said locking connection is made to the extremity of said opposite end and said remaining portion of said bushing surrounds said bar.

7. A drive mechanism comprising a rotatable cam shaft with a cam affixed thereto, said cam having a depression therein, drive means including a motor for rotating said cam shaft unidirectionally, a torsion bar, means anchoring one end of said torsion bar, means rotatably supporting the other end of said torsion bar, and cam follower means affixed to said torsion bar and engaging said cam, said cam shaped so that rotation thereof will cause said cam follower means to impart a torsional energy storage movement to said torsion bar until said depression has engaged said cam follower means, whereupon said cam follower means follows a path determined by said depression to return the energy stored in said torsion bar to said cam shaft.

8. A drive mechanism as defined by claim 7 wherein said motor operates unidirectionally.

9. An energy storage mechanism comprising a one piece torsion bar whose cross section is substantially uniform over a predetermined length and is characterized by three flattened sides arranged in a generally equilateral traingular configuration with said sides terminating in rounded corners having substantially the same radius of curvature, said flattended sides being longer than said curved sides, stationary means for anchoring one end of said torsion bar against rotation, said stationary means comprising a first stationary member having a hole shaped to receive said one end and lock said one end against rotation, said one end being positioned in said hole, means for rotatably supporting the opposite end of said torsion bar, said means for rotatably supporting the opposite end of said torsion bar comprising a second stationary member, a bushing rotatably supported by said second stationary member, said bushing including an axial bore with a cross section shaped to receive and lock to said opposite end of said shaft, said opposite end being positioned in said axial bore, and means attached to said bushing for applying torsional movement to said bar by way of said bushing whereby to store energy in said torsion bar.

10. A drive mechanism comprising a cam shaft with a cam affixed thereto, motor driven means for unidirectionally rotating said cam shaft, a torsion bar with a cross-section characterized by three flat sides arranged in a generally equilateral triangular configuration with the sides terminating in rounded corners having substantially the same radius of curvature, means anchoring one end of said torsion bar, means rotatably supporting the opposite end of said torsion bar, and means cooperating with the cam on said cam shaft to impart a torsional energy-storing movement to said torsion bar as said cam shaft rotates through a predetermined angle and to return the energy stored in said torsion bar to said cam shaft after said cam shaft has rotated through said predetermined angle.

11. A drive mechanism comprising a cam shaft with a cam affixed thereto, motor driven means for unidirectionally rotating said cam shaft, an elongate torsion bar, first means embracing and securing a first portion of said bar against rotation, second means rotatably supporting a second portion of said bar, said bar having a uniform cross section between and including said first and second portions, said uniform cross section characterized by three flat sides arranged in a generally equilateral triangular configuration with said sides terminating in rounded corners having substantially the same radius of curvature and means cooperating with the cam on said cam shaft to impart a torsional energy storing movement to said torsion bar as said cam shaft rotates through a predetermined angle and to return the energy stored in said portion bar to said cam shaft after said cam shaft has rotated through said predetermined angle.

References Cited
UNITED STATES PATENTS

| | | | |
|---|---|---|---|
| 2,238,380 | 4/1941 | Almen | 267—1 X |
| 2,559,970 | 7/1951 | King | 60—7 |
| 2,588,018 | 3/1952 | Lauenstein | 267—1 |
| 2,694,319 | 11/1954 | Johnson | 267—1 X |
| 3,150,572 | 9/1964 | Mercier | 267—1 X |

FRED C. MATTERN, Jr., *Primary Examiner.*

W. S. RATLIFF, *Assistant Examiner.*